(12) United States Patent
Sener et al.

(10) Patent No.: US 11,952,900 B2
(45) Date of Patent: Apr. 9, 2024

(54) VARIABLE GUIDE VANE SEALING (71) Applicant: General Electric Company, Schenectady, NY (US)

(72) Inventors: Alexander Martin Sener, Cincinnati, OH (US); Brian David Keith, Cincinnati, OH (US); David Alan Frey, West Chester, OH (US); Jamil Darnell Grant, Maineville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/949,601

(22) Filed: Sep. 21, 2022

(65) Prior Publication Data

US 2023/0014436 A1 Jan. 19, 2023

Related U.S. Application Data

(60) Continuation of application No. 17/079,577, filed on Oct. 26, 2020, now abandoned, which is a division of application No. 15/796,942, filed on Oct. 30, 2017, now Pat. No. 10,822,981.

(51) Int. Cl.
| | |
|---|---|
| *F01D 11/00* | (2006.01) |
| *F01D 9/04* | (2006.01) |
| *F01D 17/16* | (2006.01) |
| *F02C 3/04* | (2006.01) |
| *F02C 9/22* | (2006.01) |

(52) U.S. Cl.
CPC ............ *F01D 11/005* (2013.01); *F01D 9/042* (2013.01); *F01D 11/003* (2013.01); *F01D 17/162* (2013.01); *F02C 3/04* (2013.01); *F02C 9/22* (2013.01); *F05D 2220/32* (2013.01); *F05D 2220/3213* (2013.01); *F05D 2240/35* (2013.01)

(58) Field of Classification Search
CPC ................................ F01D 17/162; F01D 5/20
See application file for complete search history.

(56) References Cited

U.S. PATENT DOCUMENTS

| | | | |
|---|---|---|---|
| 2,819,732 | A | 1/1958 | Paetz |
| 2,979,809 | A | 4/1961 | Dennis |
| 3,606,580 | A | 9/1971 | Kaufman, Sr. |
| 3,650,635 | A | 3/1972 | Wachtell et al. |
| 4,169,692 | A | 10/1979 | McDonough et al. |
| 4,792,295 | A | 12/1988 | Joyce, Sr. |
| 5,044,881 | A | 9/1991 | Dodd et al. |
| 5,752,802 | A | 5/1998 | Jones |
| 5,941,537 | A | 8/1999 | Wallace et al. |
| 6,375,419 | B1 | 4/2002 | LeJambre et al. |
| 6,382,906 | B1 | 5/2002 | Brassfield et al. |
| 8,033,790 | B2 | 10/2011 | Vance |

(Continued)

*Primary Examiner* — Justin D Seabe
*Assistant Examiner* — John S Hunter, Jr.
(74) *Attorney, Agent, or Firm* — Dority & Manning, P.A.

(57) ABSTRACT

A variable guide vane assembly is provided for a turbine defining a core air flowpath. The variable guide vane assembly includes an airfoil band defining a flowpath surface and a cavity. The variable guide vane assembly further includes an airfoil including a first end extending at least partially into the cavity of the airfoil band and an opposite second end, the airfoil extending generally along an axis between the first end and the second end and being moveable generally about the axis relative to the airfoil band. The variable guide vane assembly further includes a sealing element operable to form a seal between the first end of the airfoil and the airfoil band.

20 Claims, 6 Drawing Sheets

(56) References Cited

U.S. PATENT DOCUMENTS

| | | |
|---|---|---|
| 8,056,336 B2 | 11/2011 | Arnold et al. |
| 8,317,465 B2 | 11/2012 | Smith |
| 9,121,301 B2 | 9/2015 | Floyd et al. |
| 9,546,562 B2 | 1/2017 | Hillier |
| 9,593,587 B2 | 3/2017 | Matsumoto et al. |
| 2013/0084169 A1 | 4/2013 | Kareff et al. |
| 2015/0030438 A1 | 1/2015 | Takahashi et al. |
| 2015/0285157 A1 | 10/2015 | Burdick et al. |
| 2015/0337664 A1 | 11/2015 | Cosi et al. |
| 2016/0258309 A1 | 9/2016 | Wilber |
| 2016/0341068 A1 | 11/2016 | Robertson, Jr. et al. |

VARIABLE GUIDE VANE SEALING

CROSS-REFERENCE TO RELATED APPLICATIONS

This application is a continuation application of U.S. application Ser. No. 17/079,577 filed Oct. 26, 2020, which is a divisional application of U.S. application Ser. No. 15/796,942 filed Oct. 30, 2017, which are hereby incorporated by reference in their entirety.

FEDERALLY SPONSORED RESEARCH

This invention was made with government support under contact number FA8650-15-D-2501 awarded by the Department of the Air Force. The U.S. government may have certain rights in the invention.

FIELD

The present subject matter relates generally to gas turbine engines. More particularly, the present subject matter relates to sealing assemblies for variable vanes in gas turbine engines.

BACKGROUND

Gas turbine engines generally include a compressor section, a combustion section, and a turbine section in serial flow order. The compressor section may include one or more compressors, each of the one or more compressors typically including sequential stages of compressor rotor blades and compressor stator vanes. Similarly, the turbine section may include one or more turbines, each of the one or more turbines typically including sequential stages of turbine rotor blades and turbine stator vanes.

The stages of stator vanes in the one or more compressors and/or the one or more turbines may change a direction of an airflow thereacross in order to increase a performance and efficiency of the gas turbine engine. The performance and efficiency of the gas turbine engine may further be increased by including stator vanes in the one or more compressors and/or the one or more turbines capable of rotating about an axis in order to vary a direction in which the stator vanes change the airflow thereacross. These are commonly referred to as variable stator vanes.

Despite the increases in performance and efficiency derived from the inclusion of variable stator vanes in the one or more compressors and/or the one or more turbines, in at least certain engines, at least a portion of the airflow thereacross may be capable of leaking around a radially inner end and/or a radially outer end of the variable stator vanes by virtue of the variable stator vanes not being fixedly attached to a respective radially inner or radially outer band. Such may have a detrimental effect on the gas turbine engine's performance, efficiency, and durability.

Accordingly, a stator vane assembly capable of varying a direction in which it directs airflow thereacross while minimizing an amount of leakage around its radially inner end/or radially outer ends would be useful.

BRIEF DESCRIPTION

Aspects and advantages of the invention will be set forth in part in the following description, or may be obvious from the description, or may be learned through practice of the invention.

In one exemplary aspect of the present disclosure, a variable guide vane assembly for a machine defining a core air flowpath is provided. The variable guide vane assembly includes an airfoil band defining a flowpath surface and a cavity. The variable guide vane assembly further includes an airfoil including a first end extending at least partially into the cavity of the airfoil band and an opposite second end, the airfoil extending generally along an axis between the first end and the second end and being moveable generally about the axis relative to the airfoil band. The variable guide vane assembly further includes a sealing element operable to form a seal between the first end of the airfoil and the airfoil band.

In certain exemplary embodiments the sealing element is positioned at least partially within the cavity of the airfoil band.

For example, in certain exemplary embodiments the airfoil defines a leading edge and a trailing edge, wherein the first end of the airfoil defines an airfoil slot extending in a direction generally from the leading edge to the trailing edge, and wherein the sealing element extends at least partially into the airfoil slot of the airfoil.

For example, in certain exemplary embodiments the airfoil defines a pressure side and a suction side, wherein the airfoil slot of the airfoil extends from the pressure side to the suction side, and wherein the sealing element extends through the airfoil slot of the airfoil.

For example, in certain exemplary embodiments the airfoil band includes a band flange, wherein the band flange defines a first side facing the core air flowpath and an opposite second side at least partially defining the cavity, and wherein the sealing element is configured to contact the second side of the band flange.

For example, in certain exemplary embodiments the airfoil band defines an airflow passage for providing pressurized air to the cavity of the airfoil band to pressurize the cavity of the airfoil band.

For example, in certain exemplary embodiments the sealing element is a substantially planar member.

For example, in certain exemplary embodiments the airfoil band defines a band slot extending to the cavity defined by the airfoil band, and wherein the sealing element further extends at least partially into the band slot of the airfoil band.

In certain exemplary embodiments the first end of the airfoil includes an airfoil flange positioned at least partially within the cavity, wherein the airfoil band includes a band flange at least partially defining the cavity, wherein the band flange defines a first side facing the core air flowpath and an opposite second side, and wherein the sealing element is configured to contact the second side of the band flange and the airfoil flange.

For example, in certain exemplary embodiments the airfoil defines a pressure side and a suction side, wherein the airfoil flange is a T-shaped flange including a first portion extending from the pressure side and a second portion extending from the suction side, and wherein the sealing element is configured to form a seal between the first portion of the airfoil flange and the band flange, between the second portion of the airfoil flange into the band flange, or both.

In certain exemplary embodiments the airfoil band includes an inner surface at least partially within the cavity, and wherein the sealing element is configured to contact and form a seal between the first end of the airfoil and the inner surface of the airfoil band.

For example, in certain exemplary embodiments the first end of the airfoil defines a channel for at least partially receiving the sealing element.

In certain exemplary embodiments the cavity defines an opening in the flowpath surface, wherein the opening of the cavity defines a shape larger than a cross-sectional shape of a portion of the first end of the airfoil extending through the opening of the cavity.

In certain exemplary embodiments the variable guide vane assembly is a variable stator vane configured for a turbine section of the gas turbine engine.

In certain exemplary embodiments the variable guide vane assembly further includes an actuation member operable with the airfoil to rotate at least a portion of the airfoil.

In another exemplary embodiment of the present disclosure, a gas turbine engine is provided. The gas turbine engine includes a compressor section; a combustion section; and a turbine section. The compressor section, combustion section, and turbine section our in serial flow order and define at least in part a core air flowpath. The turbine section includes a variable guide vane assembly, the variable guide vane assembly including an airfoil band defining a flowpath surface exposed to the core air flowpath and a cavity; and an airfoil including a first end extending at least partially into the cavity of the airfoil band and an opposite second end. The airfoil extending generally along an axis between the first end and the second end and being moveable generally about the axis relative to the airfoil band. The variable guide vane assembly also including a sealing element operable to form a seal between the first end of the airfoil and the airfoil band.

In certain exemplary embodiments the sealing element is positioned at least partially within the cavity of the airfoil band.

For example, in certain exemplary embodiments the airfoil defines a leading edge and a trailing edge, wherein the first end of the airfoil defines an airfoil slot extending in a direction generally from the leading edge to the trailing edge, and wherein the sealing element extends at least partially into the airfoil slot of the airfoil.

For example, in certain exemplary embodiments the airfoil defines a pressure side and a suction side, wherein the airfoil slot of the airfoil extends from the pressure side to the suction side, and wherein the sealing element extends through the airfoil slot of the airfoil.

For example, in certain exemplary embodiments the airfoil band includes a band flange, wherein the band flange defines a first side facing the core air flowpath and an opposite second side at least partially defining the cavity, and wherein the sealing element is configured to contact the second side of the band flange.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
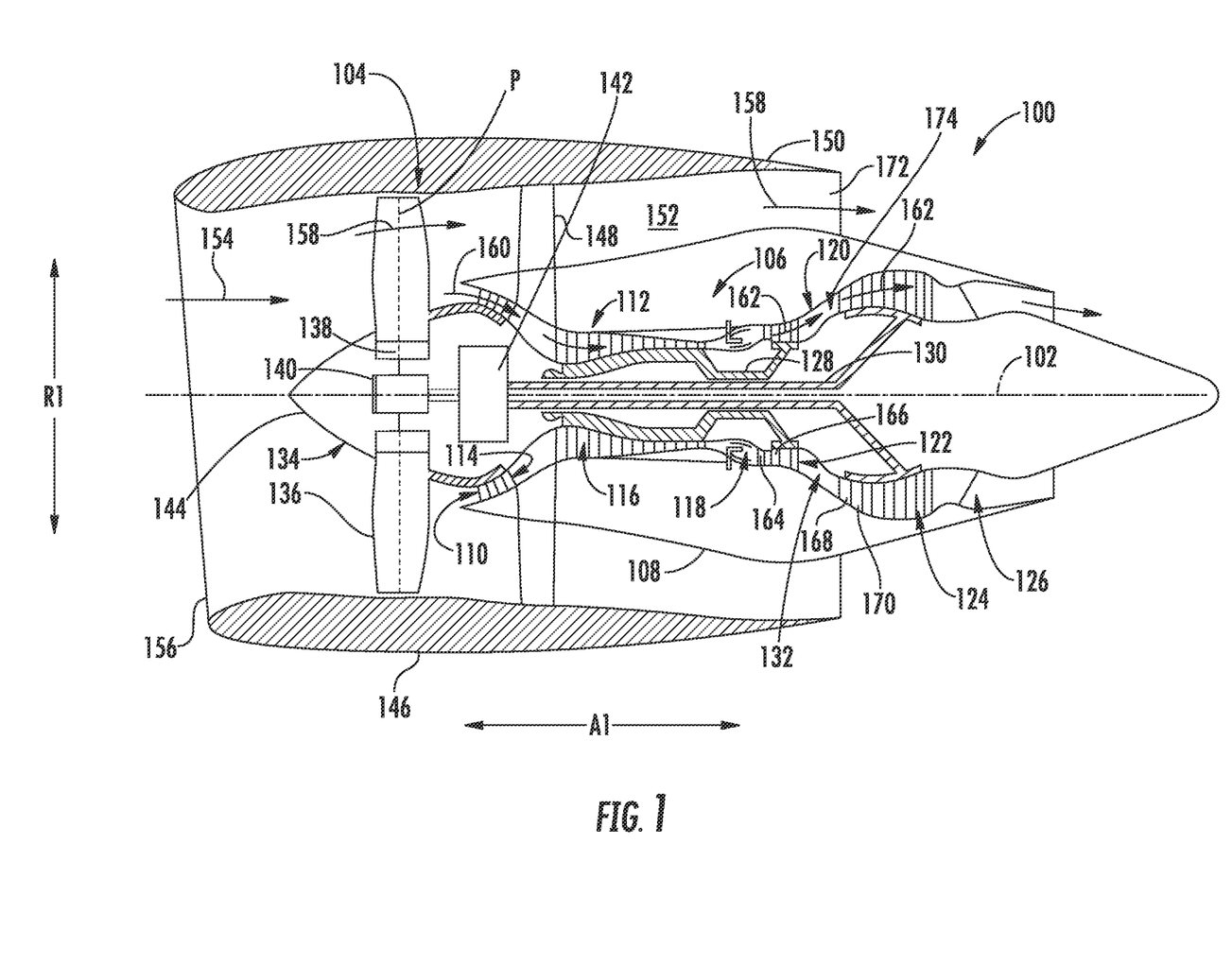
FIG. 1 is a schematic cross-sectional view of an exemplary gas turbine engine according to various embodiments of the present subject matter.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A1 (extending parallel to or coaxial with a longitudinal centerline 102 provided for reference), a radial direction R1, and a circumferential direction C1 (i.e., a direction extending about the axial direction A1; see FIG. 3). In general, the gas turbine engine 100 includes a fan section 104 and a turbomachine 106 disposed downstream from the fan section 104.

The exemplary turbomachine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. A HP shaft or spool 128 drivingly connects the HP turbine 122 to the HP compressor 116. ALP shaft or spool 130 drivingly connects the LP turbine 124 to the LP compressor 114. The compressor section, combustion section 118, turbine section, and jet exhaust nozzle section 126 together define a core air flowpath 132 through the turbomachine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable front nacelle 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the turbomachine 106. Moreover, for the embodiment depicted, the nacelle 146 is supported relative to the turbomachine 106 by a plurality of circumferentially spaced outlet guide vanes 148. Further, a downstream section 150 of the nacelle 146 extends over an outer portion of the turbomachine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the high pressure (HP) compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the turbomachine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the turbomachine 106.

It will be appreciated that the exemplary gas turbine engine 100 depicted in FIG. 1 is by way of example only, and that in other exemplary embodiments, the gas turbine engine 100 may have any other suitable configuration. For example, in other embodiments, the gas turbine engine 100 may be a variable bypass engine, may not include a power gearbox 142, may include a fixed-pitch fan, etc. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engine, such as a power generation gas turbine engine, or any aeroderivative gas turbine engine, such as a nautical gas turbine engine.

Figure 2:
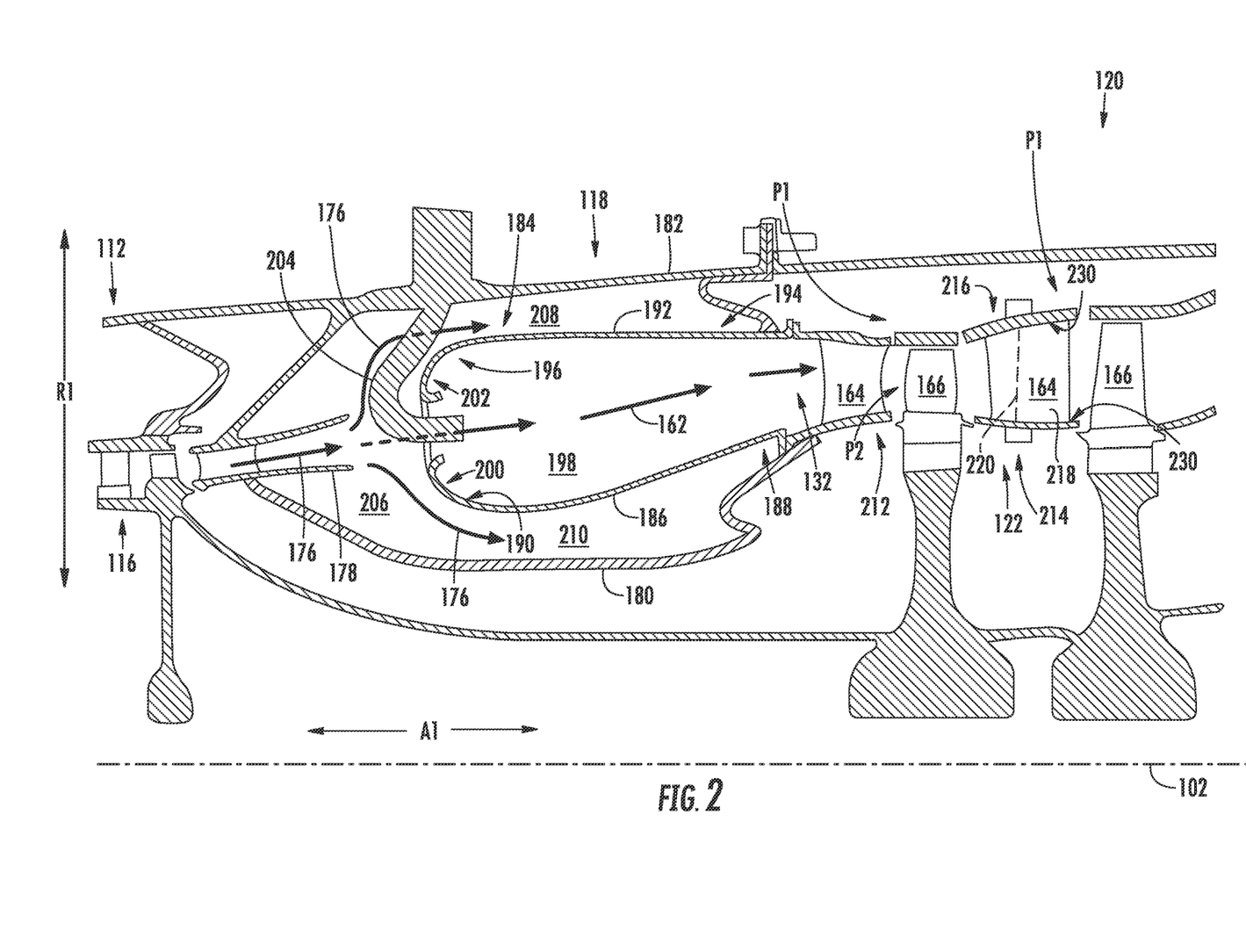
FIG. 2 is a side cross-sectional view of a compressor section, a combustion section, and a high pressure turbine section of the gas turbine engine shown in FIG. 1.

FIG. 2 provides a side cross-sectional view of the compressor section 112, combustion section 118, and the turbine section 120 of the turbomachine 106 of FIG. 1. More specifically, the rear end of the HP compressor 116, the combustor section 118, and the forward end of the HP turbine 122 are illustrated.

Compressed air 176 exits the HP compressor 116 through a diffuser 178 located at the rear end or outlet of the HP compressor 116 and diffuses into the combustion section 118. The combustion section 118 of turbomachine 106 is annularly encased by radially inner and outer combustor casings 180, 182. The radially inner combustor casing 180 and the radially outer combustor casing 182 both extend generally along the axial direction A1 and surround a combustor assembly 184 in annular rings. The inner and outer combustor casings 180, 182 are joined together at annular diffuser 178 at the forward end of the combustion section 118.

As shown, the combustor assembly 184 generally includes an inner liner 186 extending between a rear end 188 and a forward end 190 generally along the axial direction A1, as well as an outer liner 192 also extending between a rear end 194 and a forward end 196 generally along the axial direction A1. The inner and outer liners 186, 192 together at least partially define a combustion chamber 198 therebetween. The inner and outer liners 186, 192 are each attached to or formed integrally with an annular dome. More particularly, the annular dome includes an inner dome section 200 formed integrally with the forward end 190 of the inner liner 186 and an outer dome section 202 formed generally with the forward end 196 of the outer liner 192. Further, the inner and outer dome section 200, 202 may each be formed integrally (or alternatively may be formed of a plurality of components attached in any suitable manner) and may each extend along the circumferential direction C1 to define an annular shape. It should be appreciated, however, that in other embodiments, the combustor assembly 184 may not include the inner and/or outer dome sections 200, 202; may include separately formed inner and/or outer dome sections 200, 202 attached to the respective inner liner 186 and outer liner 192; or may have any other suitable configuration.

Referring still to FIG. 2, the combustor assembly 184 further includes a plurality of fuel air mixers 204 spaced along the circumferential direction C1 and positioned at least partially within the annular dome. More particularly, the plurality of fuel air mixers 204 are disposed at least partially between the outer dome section 202 and the inner dome section 200 along the radial direction R1. Compressed air 176 from the compressor section 112 of the gas turbine engine 100 flows into or through the fuel air mixers 204, where the compressed air 176 is mixed with fuel and ignited to create combustion gases 162 within the combustion chamber 198. The inner and outer dome sections 200, 202 are configured to assist in providing such a flow of compressed air 176 from the compressor section 112 into or through the fuel air mixers 204.

As discussed above, the combustion gases 162 flow from the combustion chamber 198 into and through the turbine section 120 of the gas turbine engine 100, where a portion of thermal and/or kinetic energy from the combustion gases 162 is extracted via sequential stages of turbine stator vanes and turbine rotor blades within the HP turbine 122 and LP turbine 124. More specifically, as is depicted in FIG. 2, combustion gases 162 from the combustion chamber 198 flow into the HP turbine 122, located immediately downstream of the combustion chamber 198, where thermal and/or kinetic energy from the combustion gases 162 is extracted via sequential stages of HP turbine stator vanes 164 (discussed in greater detail below) and HP turbine rotor blades 166.

As illustrated in FIG. 2, not all compressed air 176 flows into or directly through the fuel air mixers 204 and into combustion chamber 198. Some of the compressed air 176 is discharged into a plenum 206 surrounding the combustor assembly 184. Plenum 206 is generally defined between the combustor casings 180, 182 and the liners 186, 192. The outer combustor casing 182 and the outer liner 192 define an outer plenum 208 generally disposed radially outward from the combustion chamber 198. The inner combustor casing 180 and the inner liner 186 define an inner plenum 210 generally disposed radially inward with respect to the combustion chamber 198. As compressed air 176 is diffused by diffuser 178, some of the compressed air 176 flows radially outward into the outer plenum 208 and some of the compressed air 176 flows radially inward into the inner plenum 210.

The compressed air 176 flowing radially outward into the outer plenum 208 flows generally axially to the turbine section 120. Specifically, the compressed air 176 flows above the HP turbine stator vanes 164 and rotor blades 166. The outer plenum 208 may extend to the LP turbine 124 (FIG. 1) as well.

As further shown in FIG. 2, for the embodiment depicted, the HP turbine 122 includes a first stage 212 of turbine stator vanes 164 and a second stage 214 of turbine stator vanes 164 (as well as a first and second stage of turbine rotor blades 166). Moreover, for the embodiment depicted, the second stage 214 of turbine stator vanes 164 is of a variable configuration, such that the second stage 214 of turbine stator vanes 164 includes a plurality of variable guide vane assemblies 216.

Figure 3:
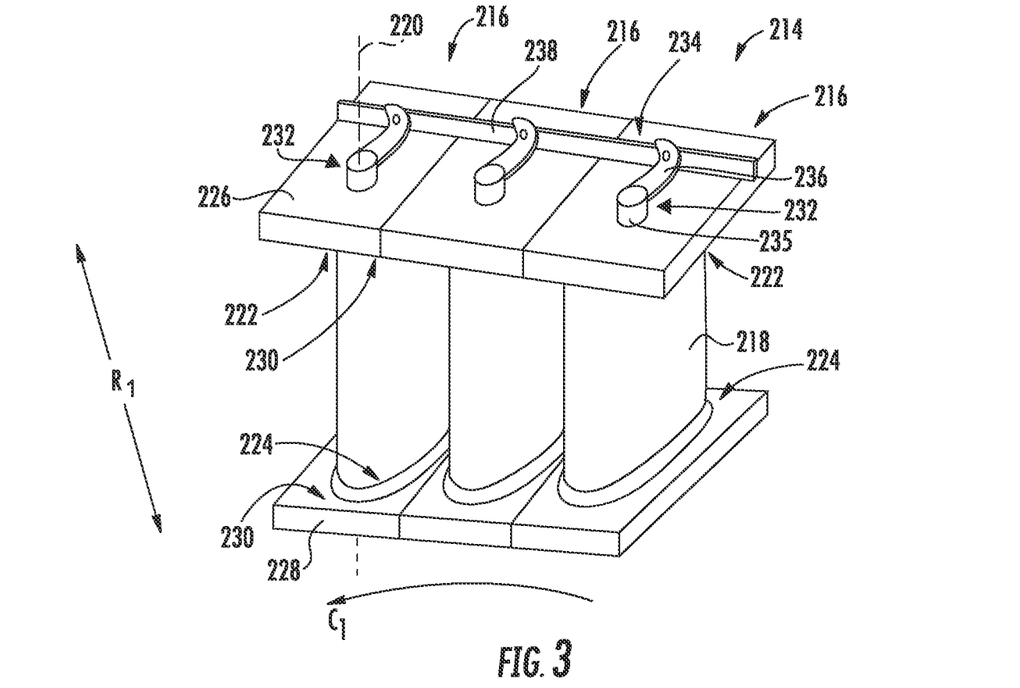
FIG. 3 is a perspective view of a second stage of variable guide vanes in a turbine section of the gas turbine engine shown in FIG. 1.

Referring now also to FIG. 3, providing a perspective view of a plurality of the exemplary variable guide vane assemblies 216 of the second stage 214 of turbine stator vanes 164, the plurality of variable guide vane assemblies 216 are spaced generally along the circumferential direction C1 of the gas turbine engine 100. Additionally, each of the variable guide vane assemblies 216 includes an airfoil 218 extending generally along an axis 220 between a first, outer end 222 (i.e., outer end along the radial direction R1) and an opposite second, inner end 224 (i.e., inner end along the radial direction R1). For the embodiment depicted, the axis 220 of each airfoil 218 is generally aligned with the radial direction R1 of the gas turbine engine 100. Moreover, each variable guide vane assembly 216 includes an outer airfoil band 226 along the radial direction R1 and an inner airfoil band 228 along the radial direction R1. Accordingly, it will be appreciated that the outer end 222 of the airfoil 218 is positioned adjacent to the radially outer airfoil band 226, and the inner end 224 of the airfoil 218 is positioned adjacent to the radially inner airfoil band 228. Additionally, the inner airfoil band 228 defines a flowpath surface 230 and the outer airfoil band 226 also defines a flowpath surface 230 (see FIG. 2)— the flowpath surface 230 of the inner airfoil band 228 and the flowpath surface 230 of the outer airfoil band 226 each at least partially defining the core air flowpath 132 through the gas turbine engine 100.

As is further depicted, each variable guide vane assembly 216 includes an actuation member 232 operable with the respective airfoil 218 for rotating at least a portion of the respective airfoil 218 along its respective axis 220. For the embodiment depicted, each of the actuation members 232 the plurality of variable guide vane assemblies 216 are configured together as a single actuation member assembly 234, such that the actuation member assembly 234 may actuate the plurality of airfoils 218 of the plurality of variable guide vane assemblies 216, e.g., in unison. More particularly, for the embodiment depicted, each actuation member 232 generally includes a hub 235 and an arm 236, and the actuation member assembly 234 includes a ring 238 connected to the arms 236 of each of the actuation members 232 to move the hubs 235 of each of the actuation members 232 together, e.g., in unison. The hubs 235 of the actuation members 232 may be coupled a respective airfoil 218 for rotating the respective airfoil 218. However, in other embodiments, the individual actuation members 232 may move at least partially independently from the other actuation members 232.

Furthermore, for the embodiment depicted, the inner airfoil bands 228 of adjacent variable guide vane assemblies 216 are coupled together to form a substantially continuous inner airfoil band assembly, and similarly, the outer airfoil bands 226 of adjacent variable guide vane assemblies 216 are coupled together to form a substantially continuous outer airfoil band assembly. However, in other exemplary embodiments, the inner and outer airfoil bands 226, 228 of the plurality of variable guide vane assemblies 216 may be configured in any other suitable manner. Further, in other exemplary embodiments, the actuation member assembly 234 may be configured in any other suitable manner for actuating the plurality of airfoils 218. Further, still, in other exemplary embodiments, the airfoils 218 of the variable guide vane assemblies 216 may be configured in any other suitable manner for varying an effective flow angle across the respective airfoils 218. For example, in other exemplary embodiments, the entire airfoil 218 of each variable guide vane assembly 216 may not be movable, and instead, each airfoil 218 may include a tail section (e.g., at a trailing edge 246) configured to rotate about an axis 220 to vary an effective flow angle across the respective airfoil 218.

Figure 4:
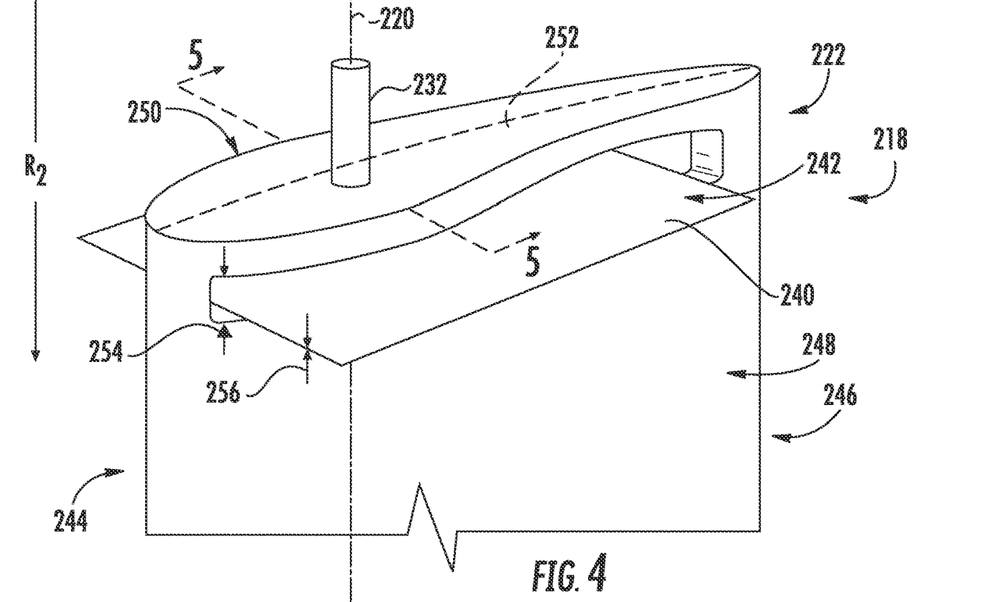
FIG. 4 is a perspective view of an airfoil of a variable guide vane assembly including an embodiment of the present disclosure.
Figure 5:
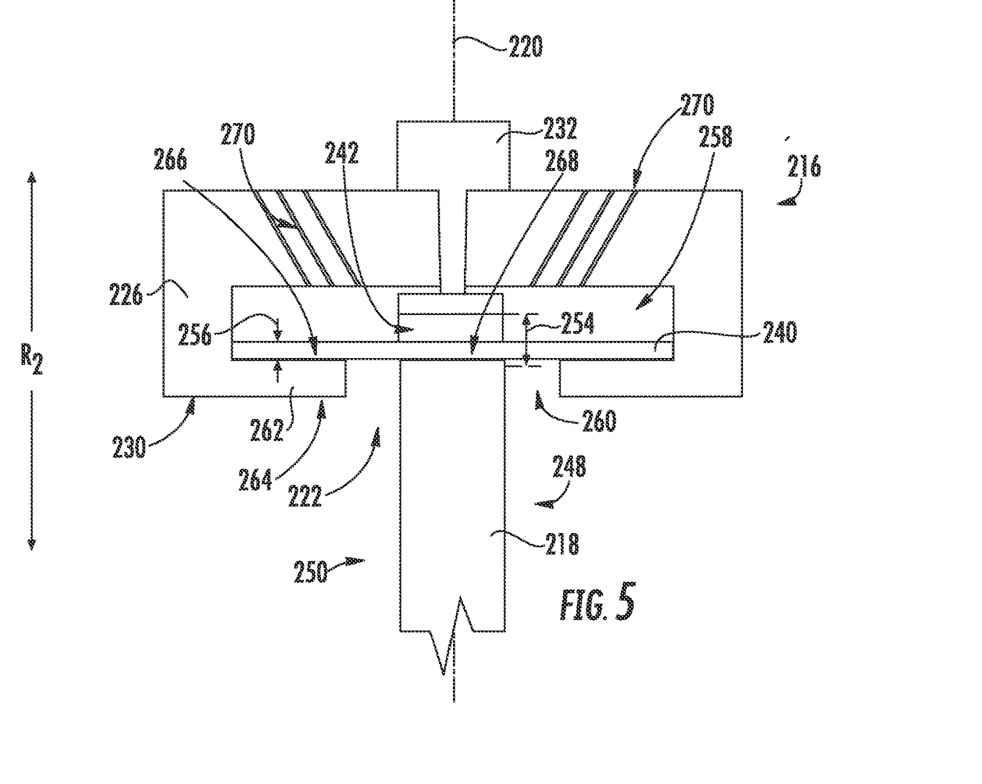
FIG. 5 is a cross-sectional view taken along line 5-5 of FIG. 3.

Referring now to FIGS. 4 and 5, it will be appreciated that at least one of the outer end 222 of the airfoil 218 or the inner end 224 of the airfoil 218 of each variable guide vane assembly 216 is configured with the respective outer airfoil band 226 and inner airfoil band 228 to prevent airflow from an upstream location or high pressure location of the variable guide vane assemblies 216 from "leaking" to a downstream location or low pressure location. FIG. 4 provides a perspective view of an outer end 222 of an airfoil 218 of an exemplary variable guide vane assembly 216 and FIG. 5 provides a cross-sectional view of the outer end 222 of the exemplary airfoil 218 of FIG. 4 configured with an outer airfoil band 226 of the variable guide vane assembly 216. The variable guide vane assembly 216 of FIGS. 4 and 5 may be the same variable guide vane assembly 216 described above with reference to FIGS. 1 through 3. As is depicted, the variable guide vane assembly 216 of FIGS. 4 and 5 further includes a sealing element 240 operable to form a seal between the outer end 222 of the airfoil 218 and the outer airfoil band 226. Notably, although not depicted, the variable guide vane assembly 216 may further include another sealing element operable to form a seal between the inner end 224 of the airfoil 218 the inner airfoil band 228.

As is depicted, the outer end 222 of the airfoil 218 defines an airfoil slot 242. More particularly, the airfoil 218 generally includes a leading edge 244 and an opposite trailing edge 246, as well as a pressure side 248 and an opposite suction side 250. The airfoil slot 242 defined by the outer end 222 of the airfoil 218 extends in a direction generally from the leading edge 244 to the trailing edge 246, and further extends from the pressure side 248 to the suction side 250. More particularly, the airfoil slot 242 extends through the outer end 222 of the airfoil 218 from the pressure side 248 to the suction side 250, and further extends substantially from the leading edge 244 to the trailing edge 246. However, in other exemplary embodiments, the airfoil slot 242 may not extend completely from the pressure side 248 to the suction side 250 (e.g., see FIG. 3), and may not extend substantially from the leading edge 244 to a trailing edge 246. For example, the airfoil 218 generally defines a camber line 252. The airfoil slot 242 may extend along at least fifty percent of the camber line 252, such as at least about sixty percent of the camber line 252 such as at least about seventy-five percent of camber line 252.

Additionally, as is depicted, the sealing element 240 extends at least partially into the airfoil slot 242 of the airfoil 218. More particularly, for the embodiment depicted the sealing element 240 extends completely through the airfoil slot 242 of the airfoil 218 (i.e., from the pressure side 248 through the suction side 250). Additionally, the sealing element 240 is a substantially planar member. Notably, the airfoil slot 242 defines a height 254 generally along the axis 220 of the airfoil 218 and the sealing element 240 defines a thickness 256. The thickness 256 of the sealing element 240 is less than the height 254 of the airfoil slot 242, allowing the sealing element 240 to move relative to the airfoil 218 generally along the axis 220 of the airfoil 218. As will be discussed in greater detail below, such may allow for the sealing element 240 to form a better seal with the outer airfoil band 226. For example, in certain embodiments, the thickness 256 of the sealing element 240 may be at least about ten percent less than the height 254 of the airfoil slot 242, such as at least about twenty percent less than the height 254 of the airfoil slot 242, such as at least about thirty percent less than the height 254 of the airfoil slot 242, such as at least about fifty percent less than the height 254 of the airfoil slot 242. As used herein, the terminology "variable B being X percent less than variable A" refers to the variable B being equal to variable A minus variable A times X.

Referring now particularly to FIG. 5, which is a view along Line 5-5 of FIG. 4, it will be appreciated that the outer airfoil band 226 further defines a cavity 258 having an opening 260 in the flowpath surface 230 of the outer airfoil band 226. The outer end 222 of the airfoil 218 extends at least partially into the cavity 258 of the outer airfoil band 226, and similarly, the sealing element 240 is positioned at least partially within the cavity 258 of the outer airfoil band 226. More particularly, for the embodiment depicted, the sealing element 240 is positioned completely within the cavity 258 of the outer airfoil band 226. Moreover, it will be appreciated that for the embodiment depicted, the opening 260 of the cavity 258 defines a shape larger than a cross-sectional shape of a portion of the outer end 222 of the airfoil 218 extending through the opening 260 of the cavity 258. Such may allow for the airfoil 218 to rotate about the axis 220 relative to the outer airfoil band 226 when actuated by the actuation member 232.

Furthermore, as is also depicted in FIG. 5, for the embodiment depicted, the outer airfoil band 226 further includes a band flange 262, with the band flange 262 defining a first side 264 facing the core air flowpath 132 and an opposite second side 266 at least partially defining the cavity 258. The band flange 262 extends at least partially around the opening 260 of the cavity 258. Additionally, the first side 264 of the band flange 262 is substantially continuous with the flowpath surface 230 of the outer airfoil band 226. In order to prevent airflow from within the core air flowpath 132 from leaking from an upstream location, or pressure side 248 location, of the airfoil 218 to a downstream location, or suction side 250 location, of the airfoil 218, the sealing element 240 is configured to contact the second side 266 of the band flange 262, creating a seal therewith. Moreover, for the embodiment depicted, the sealing element 240 is configured to contact an inner surface 268 of the airfoil slot 242 to further form a seal therewith.

Notably, in order to increase the effectiveness of the sealing element 240, the variable guide vane assembly 216 is configured to pressurize the cavity 258 to further press the sealing element 240 against the second side 266 of the band flange 262 and the inner surface 268 of the airfoil slot 242. More particularly, for the exemplary embodiment depicted, the outer airfoil band 226 defines an airflow passage 270 for providing pressurized air to the cavity 258 of the outer airfoil band 226 to pressurize the cavity 258 of the outer airfoil band 226. More particularly, for the exemplary embodiment depicted, the outer airfoil band 226 defines a plurality of airflow passages 270 for providing pressurized air to the cavity 258 of the outer airfoil band 226 to pressurize the cavity 258 of the outer airfoil band 226. In certain exemplary embodiments, the pressurization air may be compressed air 176 received from the outer plenum 208. However, in other exemplary embodiments, the pressurized air may be taken from any other suitable high pressure air source.

It will be appreciated that although the discussion herein is directed primarily to the outer end 222 of the airfoil 218 being positioned within the cavity 258 of the outer airfoil band 226 with the sealing element 240 being operable to form a seal between the outer end 222 of the airfoil 218 in the outer airfoil band 226, in other exemplary embodiments the inner end 224 of the airfoil 218 and inner airfoil band 228 may be configured in a similar manner. For example, in other exemplary embodiments, the inner airfoil band 228 may also define a cavity having an opening in the flowpath surface 230 with the inner end 224 of the airfoil 218 positioned at least partially within the cavity of the inner airfoil band 228. Further, a sealing element may be provided and positioned at least partially within the cavity of the inner airfoil band 228 and operable to form a seal between the inner end 224 of the airfoil 218 and the inner airfoil band 228.

Inclusion of a variable guide vane assembly in accordance with one or more of the exemplary embodiments provided herein may results in a more efficient gas turbine engine as such a variable guide vane assembly may reduce an amount of air leakage of the airflow through the core air flowpath from a high pressure area to a low pressure area around an outer end and/or an inner end of an airfoil of the variable guide vane assembly.

It should be appreciated, however, that in other exemplary embodiments, the variable guide vane assembly 216 may be configured in any other suitable manner for reducing a leakage of the airflow through the core air flowpath 132 around the airfoil 218.

Figure 6:
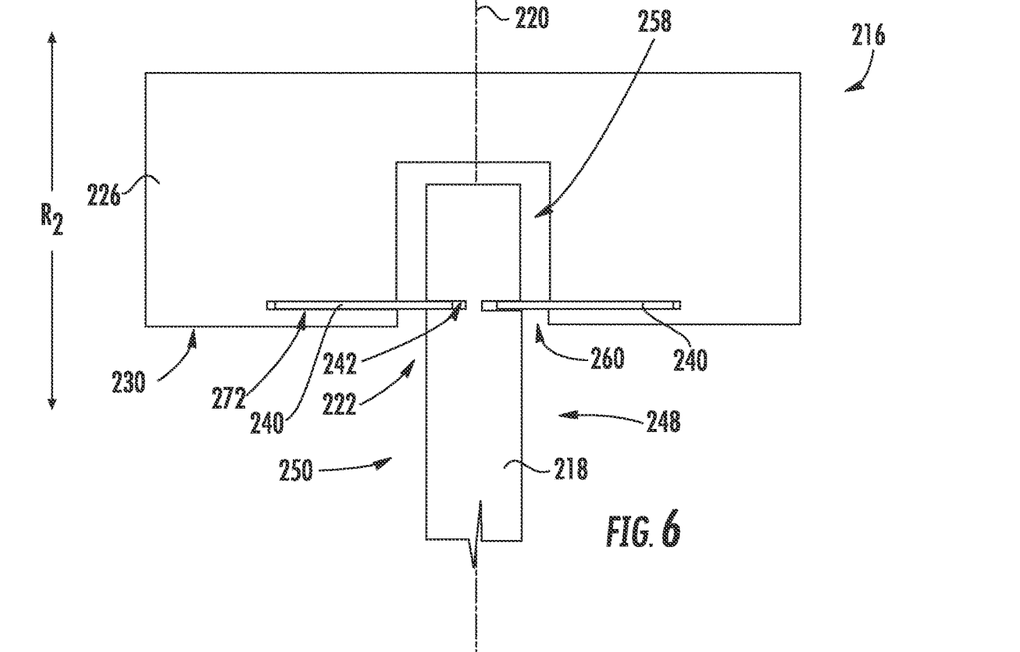
FIG. 6 is a cross-sectional view of a section of a variable guide vane assembly in accordance with another exemplary embodiment of the present disclosure.

For example, referring now to FIG. 6, a cross-sectional view of an outer end 222 of an airfoil 218 positioned within an outer airfoil band 226 of a variable guide vane assembly 216 in accordance with another exemplary embodiment of the present disclosure is provided. The exemplary variable guide vane assembly 216 of FIG. 6 may be configured in substantially the same manner as the exemplary variable guide vane assembly 216 described above with reference to FIGS. 2 through 5, and the view of FIG. 6 is from the same perspective as the view from FIG. 5. For example, the variable guide vane assembly 216 may generally include an outer airfoil band 226 defining a flowpath surface 230 and a cavity 258, with the cavity 258 including an opening 260 in the flowpath surface 230. The variable guide vane assembly 216 may further include an airfoil 218 having an outer end 222 extending at least partially into the cavity 258 of the outer airfoil band 226 and a sealing element 240 operable to form a seal between the outer end 222 of the airfoil 218 and the outer airfoil band 226. Moreover, the outer end 222 of the airfoil 218 defines a leading edge 244 (see, e.g., embodiment of FIG. 4), a trailing edge 246 (see, e.g., embodiment of FIG. 4), a pressure side 248, a suction side 250, and an airfoil slot 242 extending in a direction generally from the leading edge 244 to the trailing edge 246 and from the pressure side 248 to the suction side 250. The sealing element 240 extends at least partially into the airfoil slot 242 of the airfoil 218.

However, for the exemplary aspect of FIG. 6, the outer airfoil band 226 further defines a band slot 272 extending to the cavity 258 defined by the outer airfoil band 226. The sealing element 240 is configured as a planar member extending at least partially into the band slot 272 of the outer airfoil band 226 and further at least partially into the airfoil slot 242. More particularly, for the embodiment depicted, the band slot 272 extends around the outer end 222 of the airfoil 218, such that the band slot 272 is positioned on both the pressure side 248 and the suction side 250 of the airfoil 218, and such that the sealing element 240 forms a seal around the outer end 222 of the airfoil 218 on both the pressure side 248 and the suction side 250.

Moreover, it will be appreciated that for the embodiment depicted, the airfoil slot 242 does not extend completely from the pressure side 248 to the suction side 250 of the airfoil 218 for the exemplary embodiment depicted. Accordingly, the airfoil slot 242 depicted includes a pressure side portion and a suction side portion, and similarly the sealing element 240 includes a first portion positioned at least partially in the pressure side portion of the airfoil slot 242 and a second portion positioned at least partially in the suction side portion of the airfoil slot 242. Further, for the embodiment depicted, a height of the airfoil slot is substantially equal to a thickness of the sealing element 240.

Figure 7:
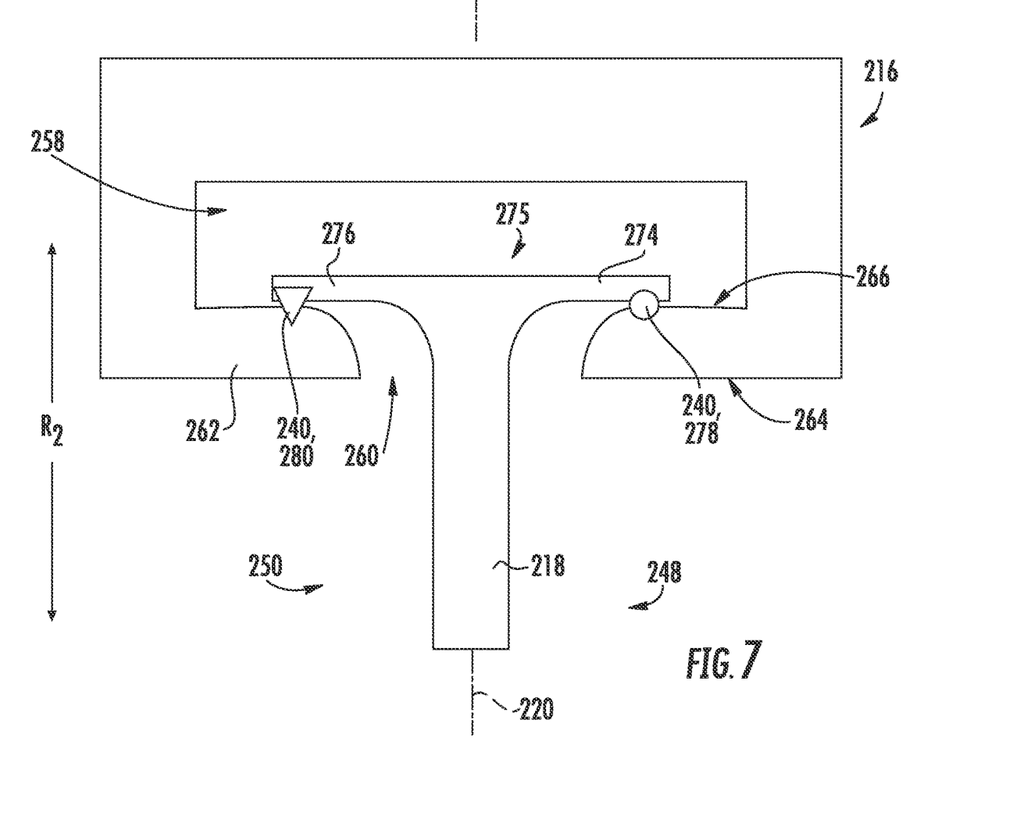
FIG. 7 is a cross-sectional view of a section of a variable guide vane assembly in accordance with still another exemplary embodiment of the present disclosure.
Figure 8:
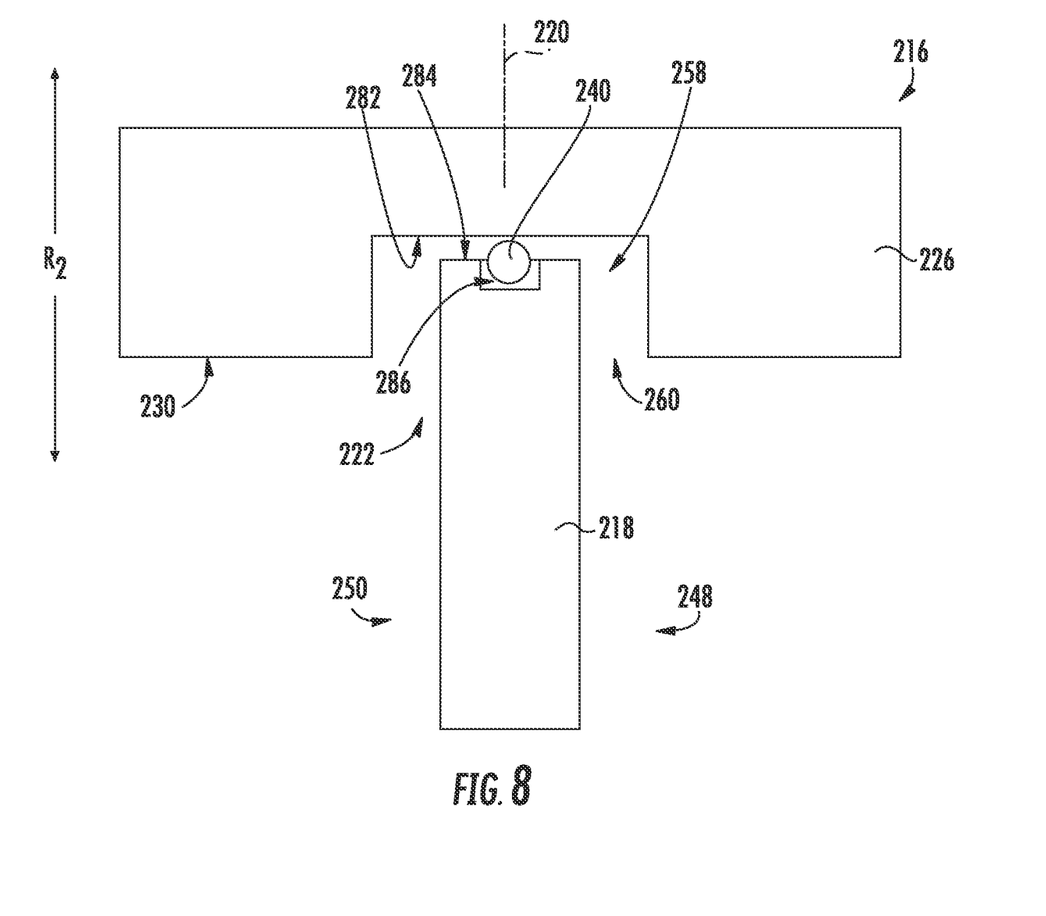
FIG. 8 is a cross-sectional view of a section of a variable guide vane assembly in accordance with yet another exemplary embodiment of the present disclosure.

Further, in still other exemplary embodiments, other configurations may be provided. For example, referring now to FIGS. 7 and 8, two additional embodiments are provided. The exemplary embodiments of FIGS. 7 and 8 may each also be configured in substantially the same manner as exemplary embodiment described above with reference to FIGS. 2 through 5, and the views of FIGS. 7 and 8 are each from the same perspective as the view from FIG. 5. For example, the variable guide vane assemblies 216 of FIGS. 7 and 8 each generally include an outer airfoil band 226 defining a flowpath surface 230 and a cavity 258, with the cavity 258 including an opening 260 in the flowpath surface 230. The variable guide vane assemblies 216 each further include an airfoil 218 having an outer end 222 extending at least partially into the cavity 258 of the respective outer airfoil band 226 and a sealing element 240 operable to form a seal between the respective outer ends 222 of the airfoils 218 and the outer airfoil bands 226.

Referring first to exemplary embodiment of FIG. 7, for the embodiment depicted, the outer airfoil band 226 further comprises a band flange 262, with the band flange 262 defining a first side 264 facing the core air flowpath 132 and an opposite second side 266 at least partially defining the cavity 258. The band flange 262 extends at least partially around the opening 260 of the cavity 258. Additionally, the first side 264 of the band flange 262 is substantially continuous with the flowpath surface 230 of the outer airfoil band 226. Further, the outer end 222 of the airfoil 218 includes an airfoil flange 275 positioned at least partially within the cavity 258. For the embodiment depicted, the sealing element 240 is configured to contact the second side 266 of the band flange 262 and the airfoil flange 275 to provide a seal therebetween. More particularly, for the embodiment depicted, the airfoil 218 defines a pressure side 248 and a suction side 250 and the airfoil flange 275 is configured as a T-shaped flange. The T-shaped flange includes a first portion 274 extending from the pressure side 248 of the airfoil 218 and a second portion 276 extending from the suction side 250 of the airfoil 218. The sealing element 240 similarly includes a first portion 278 configured to form a seal between the first portion 274 of the airfoil flange 275 and the second side 266 of the band flange 262, as well as a second portion 280 configured to form a seal between the second portion 276 of the airfoil flange 275 and the second side 266 of the band flange 262. However, in other exemplary embodiments, the airfoil flange 275 may be positioned on the other side of the band flange 262, such that the sealing elements 278, 280 instead contact, and form a seal between, the first side 264 of the band flange 262 and the airfoil flange 275. Further, although for the embodiment depicted the sealing element 240 is configured to form a seal between the first portion 274 of the airfoil flange 275 and the band flange 262, as well as between the second portion 276 of the airfoil flange 275 and the band flange 262, in other exemplary embodiments, the sealing element 240 may instead be configured to form a seal between only one of the first portion 274 of the airfoil flange 275 and the band flange 262, or between the second portion 276 of the airfoil flange 275 and the band flange 262

Notably, for the embodiment depicted, the first portion 278 of the sealing element 240 defines a different cross-sectional shape than the second portion 280 of the sealing element 240. Such may allow for the first and second portions 278, 280 of the sealing element 240 to provide different sealing thresholds (i.e., be capable of withstanding different differential pressures). However, in other exemplary embodiments, the first and second portions 278, 280 of the sealing element 240 may have same cross-sectional shapes.

Referring now to the exemplary embodiment of FIG. 8, for the embodiment depicted, the outer airfoil band 226 further includes an inner surface 282 at least partially within the cavity 258, and at least partially defining the cavity 258. Further, the outer end 222 of the airfoil 218 includes a radially outer surface 284. The sealing element 240 is configured to contact and form a seal between the radially outer surface 284 of the outer end 222 of the airfoil 218 and the inner surface 282 of the outer airfoil band 226. More particularly, for the embodiment depicted, the outer end 222 of the airfoil 218, or rather, the radially outer surface 284 of the outer end 222 of the airflow, defines a channel 286 for at least partially receiving the sealing element 240. Such a channel 286 may ensure the sealing element 240 remains in place during a rotation or actuation of the airfoil 218. Notably, however, in other exemplary embodiments, the inner surface 282 of the outer airfoil band 226 may instead define the channel.

It will be appreciated, that the various sealing elements 240 described herein may be formed of any suitable material for forming a seal between the two components. Notably, for each of the exemplary embodiment depicted, the variable guide vane assemblies 216 are configured as variable stator vanes configured for a turbine section of the gas turbine engine (depicted as being in the HP turbine 122, but may alternatively be in the LP turbine 124 or an intermediate turbine, if provided). Accordingly, the various sealing elements 240 described herein may be capable of withstanding the relatively high temperatures within a respective portion of the turbine section.

Notably, however, in other exemplary embodiments, the variable guide vane assembly may instead be positioned at any other suitable location within a gas turbine engine (such as, for example, a compressor section). Additionally, although described herein as being utilized with the gas turbine engine, in other exemplary embodiments, the variable guide vane assembly may instead be positioned within any other suitable machine, such as within any other suitable machine including a turbine or a compressor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A variable guide vane assembly for a machine defining a core air flowpath, the variable guide vane assembly comprising:
    an airfoil band defining a surface exposed to the core air flowpath and a cavity, the airfoil band including an airfoil band flange defining a first side facing the core air flowpath and an opposing second side facing the cavity;
    an airfoil comprising a first end and an opposite second end and an airfoil flange disposed in the cavity of the airfoil band radially outward of the airfoil band flange, the airfoil extending along an axis between the first end and the second end and being moveable about the axis relative to the airfoil band; and
    a sealing element positioned at the first end to contact and to form a seal between the airfoil flange at the first end of the airfoil and the second side of the airfoil band flange.

2. The variable guide vane assembly of claim 1, wherein the first end of the airfoil includes an outer surface along a radial direction, and wherein the sealing element is configured to contact and to form a seal between the outer surface of the first end of the airfoil and the second side of the airfoil band flange.

3. The variable guide vane assembly of claim 1, wherein the first end of the airfoil defines a channel for at least partially receiving the sealing element.

4. The variable guide vane assembly of claim 1, wherein the machine is a gas turbine engine.

5. The variable guide vane assembly of claim 4, wherein the airfoil is a variable stator vane configured for a turbine section of the gas turbine engine.

6. The variable guide vane assembly of claim 4, wherein the airfoil is a variable stator vane configured for a high pressure turbine of a turbine section of the gas turbine engine.

7. The variable guide vane assembly of claim 1, wherein the airfoil extends between a leading edge and a trailing edge, and wherein the sealing element extends along a length of the airfoil between the leading edge and the trailing edge.

8. The variable guide vane assembly of claim 1, wherein the sealing element extends from a location forward of the axis to a location aft of the axis.

9. The variable guide vane assembly of claim 1, wherein the airfoil band is an outer airfoil band.

10. The variable guide vane assembly of claim 9, wherein the sealing element is located inward of the surface of the airfoil band along a radial direction.

11. The variable guide vane assembly of claim 1, wherein the airfoil flange includes a first portion extending from a pressure side of the airfoil and a second portion extending from a suction side of the airfoil, and wherein the sealing element is further positioned to contact and to form a seal between the first portion of the airfoil flange and the second side of the airfoil band flange and to form a second seal between the second portion of the airfoil flange and the second side of the airfoil band flange.

12. A gas turbine engine comprising:
a compressor section;
a combustion section; and
a turbine section,
the compressor section, the combustion section, and the turbine section in serial flow order and defining at least in part a core air flowpath, the turbine section comprising a variable guide vane assembly comprising:
an airfoil band defining a surface exposed to the core air flowpath and a cavity, the airfoil band including an airfoil band flange defining a first side facing the core air flowpath and an opposing second side facing the cavity;
an airfoil comprising a first end and an opposite second end and an airfoil flange disposed in the cavity of the airfoil band radially outward of the airfoil band flange, the airfoil extending along an axis between the first end and the second end and being moveable about the axis relative to the airfoil band; and
a sealing element positioned at the first end to contact and to form a seal between the airfoil flange at the first end of the airfoil and the second side of the airfoil band flange.

13. The gas turbine engine of claim 12, wherein the first end of the airfoil includes an outer surface along a radial direction, and wherein the sealing element is configured to contact and to form a seal between the outer surface of the first end of the airfoil and the surface of the airfoil band.

14. The gas turbine engine of claim 12, wherein the first end of the airfoil defines a channel for at least partially receiving the sealing element.

15. The gas turbine engine of claim 12, wherein the airfoil is a variable stator vane configured for a turbine section of the gas turbine engine.

16. The gas turbine engine of claim 12, wherein the airfoil is a variable stator vane configured for a high pressure turbine of a turbine section of the gas turbine engine.

17. The gas turbine engine of claim 12, wherein the airfoil extends between a leading edge and a trailing edge, and wherein the sealing element extends along a length of the airfoil between the leading edge and the trailing edge.

18. The gas turbine engine of claim 12, wherein the sealing element extends from a location forward of the axis to a location aft of the axis.

19. The gas turbine engine of claim 12, wherein the airfoil band is an outer airfoil band.

20. The gas turbine engine of claim 19, wherein the sealing element is located inward of the surface of the airfoil band along a radial direction.

\* \* \* \* \*